United States Patent [19]

Fleming et al.

[11] Patent Number: 5,566,978
[45] Date of Patent: Oct. 22, 1996

[54] VEHICLE SEAT BELT SYSTEM

[75] Inventors: William J. Fleming, Rochester Hills; Barney J. Bauer, Fenton, both of Mich.

[73] Assignee: TRW Vehicle Safety Systems Inc., Lyndhurst, Ohio

[21] Appl. No.: 429,052

[22] Filed: Apr. 26, 1995

[51] Int. Cl.$^6$ .......................... B60R 22/20; B60R 22/28; B60R 22/46
[52] U.S. Cl. .................... 280/801.2; 280/805; 280/806; 297/472; 297/480; 242/379.1; 188/377
[58] Field of Search ................. 280/801.2, 805, 280/806, 808; 297/472, 471, 483, 480; 188/377, 371; 242/379.1, 374

[56] References Cited

U.S. PATENT DOCUMENTS

| | | | |
|---|---|---|---|
| 3,198,288 | 8/1965 | Presunka | 297/472 |
| 3,901,531 | 8/1975 | Prochazka . | |
| 3,917,031 | 11/1975 | Doin et al. . | |
| 3,923,321 | 12/1975 | Bauer et al. . | |
| 4,166,642 | 9/1979 | Jahn et al. . | |
| 4,227,593 | 10/1980 | Bricmont et al. | 188/377 |
| 4,258,934 | 3/1981 | Tsuge et al. . | |
| 4,518,174 | 5/1985 | Sedlmayr | 280/801.2 |
| 4,645,233 | 2/1987 | Bruse et al. | 280/801.2 |
| 4,750,685 | 6/1988 | Frei . | |
| 4,846,498 | 7/1989 | Fohl | 280/801.2 |
| 5,211,694 | 5/1993 | Sakakida et al. | 280/806 |
| 5,234,181 | 8/1993 | Schroth . | |
| 5,294,150 | 3/1994 | Steffens, Jr. | 280/801.2 |
| 5,431,448 | 7/1995 | Ball et al. | 280/801.2 |

*Primary Examiner*—Kevin Hurley
*Assistant Examiner*—Peter C. English
*Attorney, Agent, or Firm*—Tarolli, Sundheim, Covell, Tummino & Szabo

[57] ABSTRACT

In a seat belt system (10), a plurality of sensors (76, 80, 84) sense characteristics of a vehicle occupant and of a vehicle collision. The vehicle occupant sensors (80, 84) cooperate with a controller (90) to control a motor (60) which sets the position of a movable D-ring stop (70). The position of the stop (70) determines the position to which a movable D-ring (28) is repositioned in the event of a vehicle collision. The system (10) also includes a retractor (30) supported for movement on the vehicle. A crushable energy absorbing material, preferably a honeycomb (230), is disposed in the path of movement of a crush plate (160) movable with the retractor (30). The crushable material (230) controls movement of the crush plate (160) and thus of the retractor (30). Together with the repositioning of the D-ring (28), this reduces the abruptness of the load on the vehicle occupant during a vehicle collision.

20 Claims, 6 Drawing Sheets

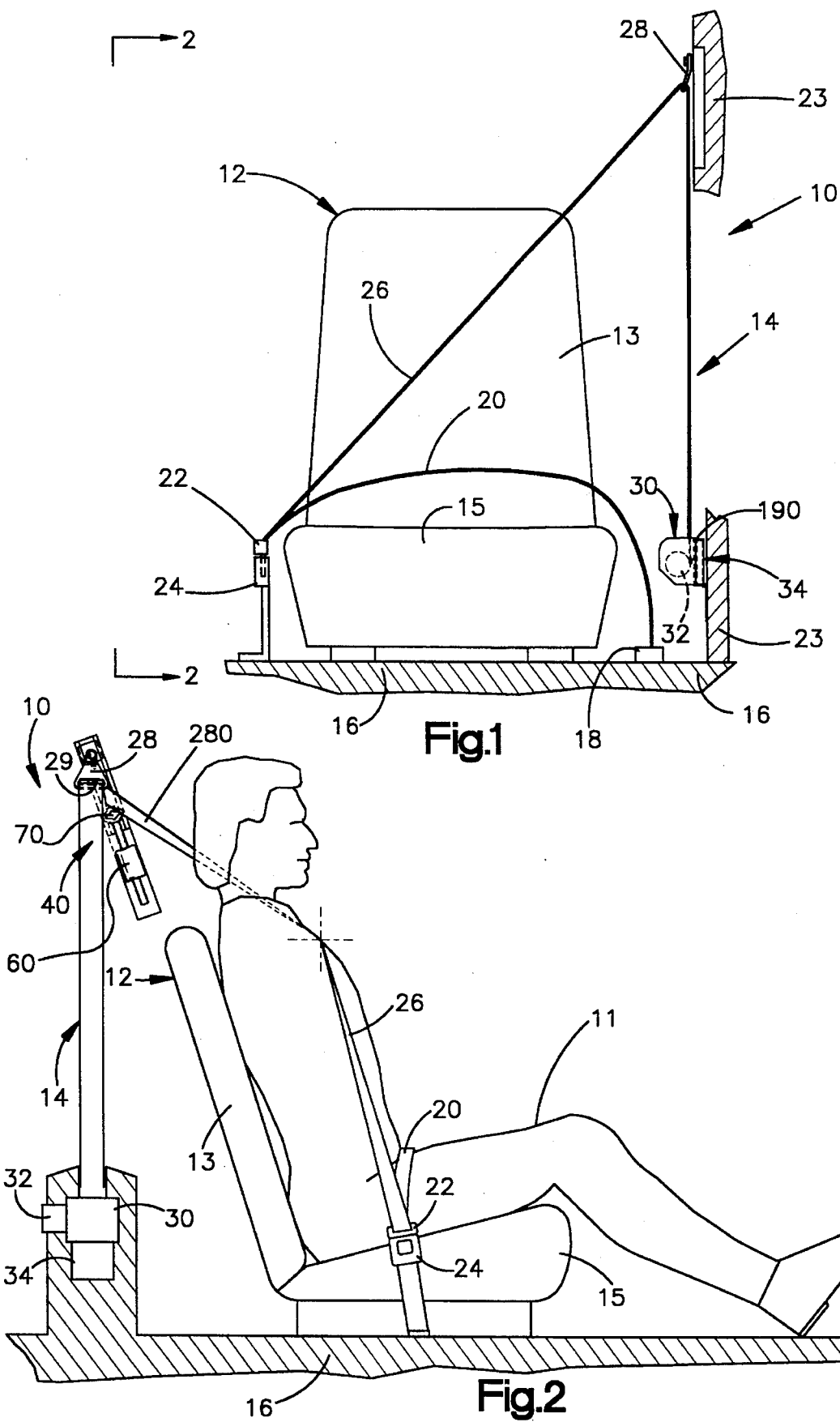

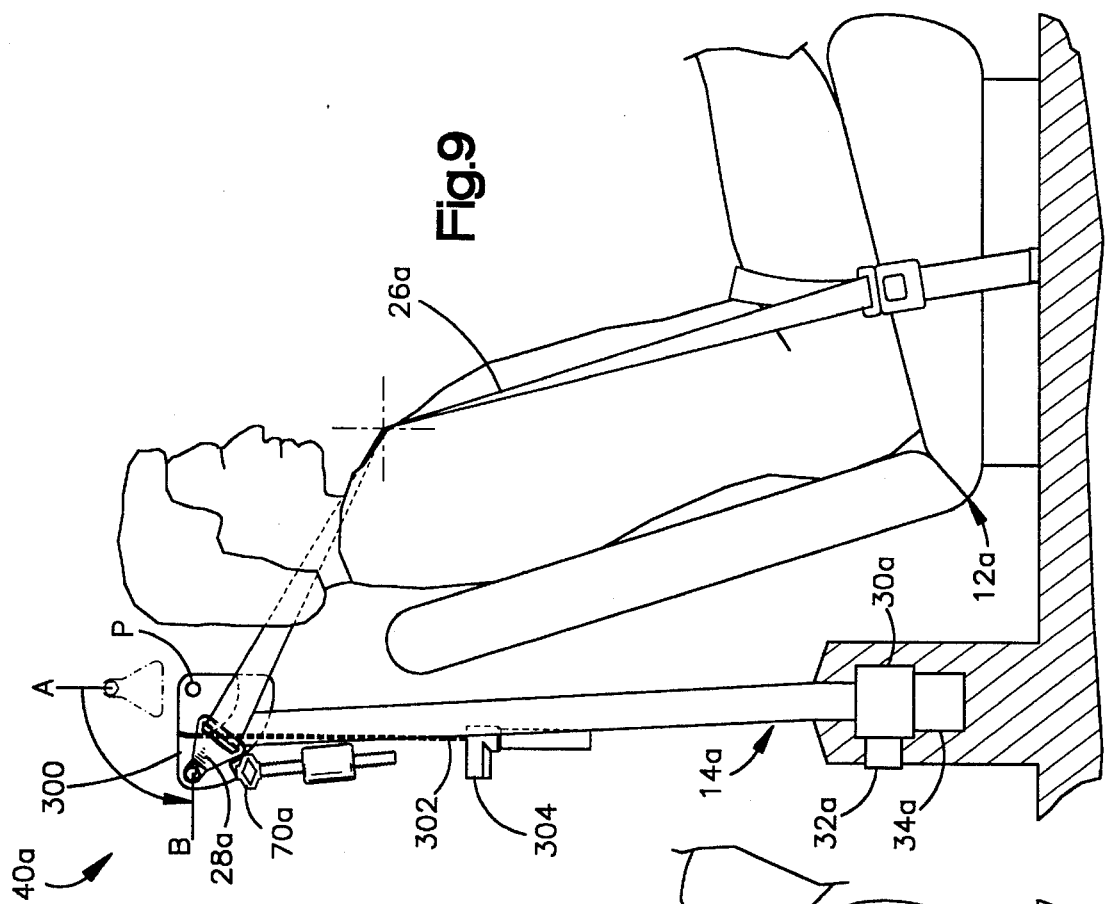
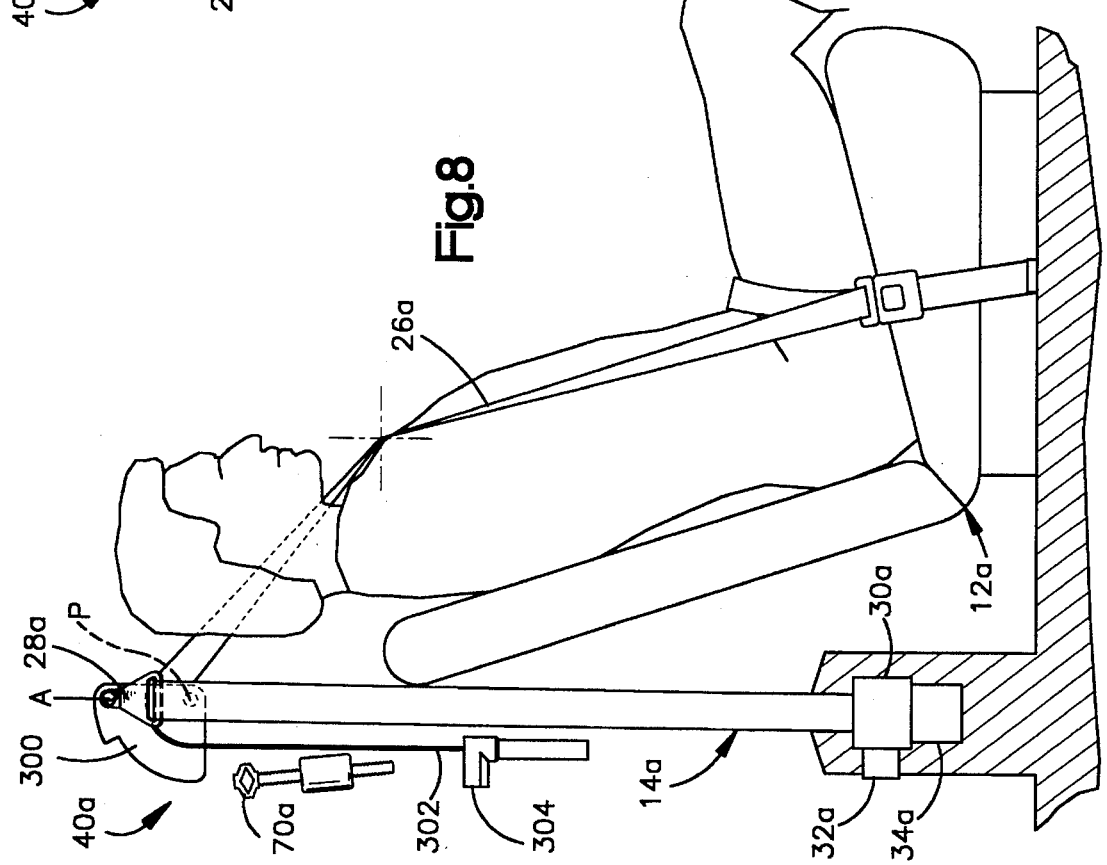

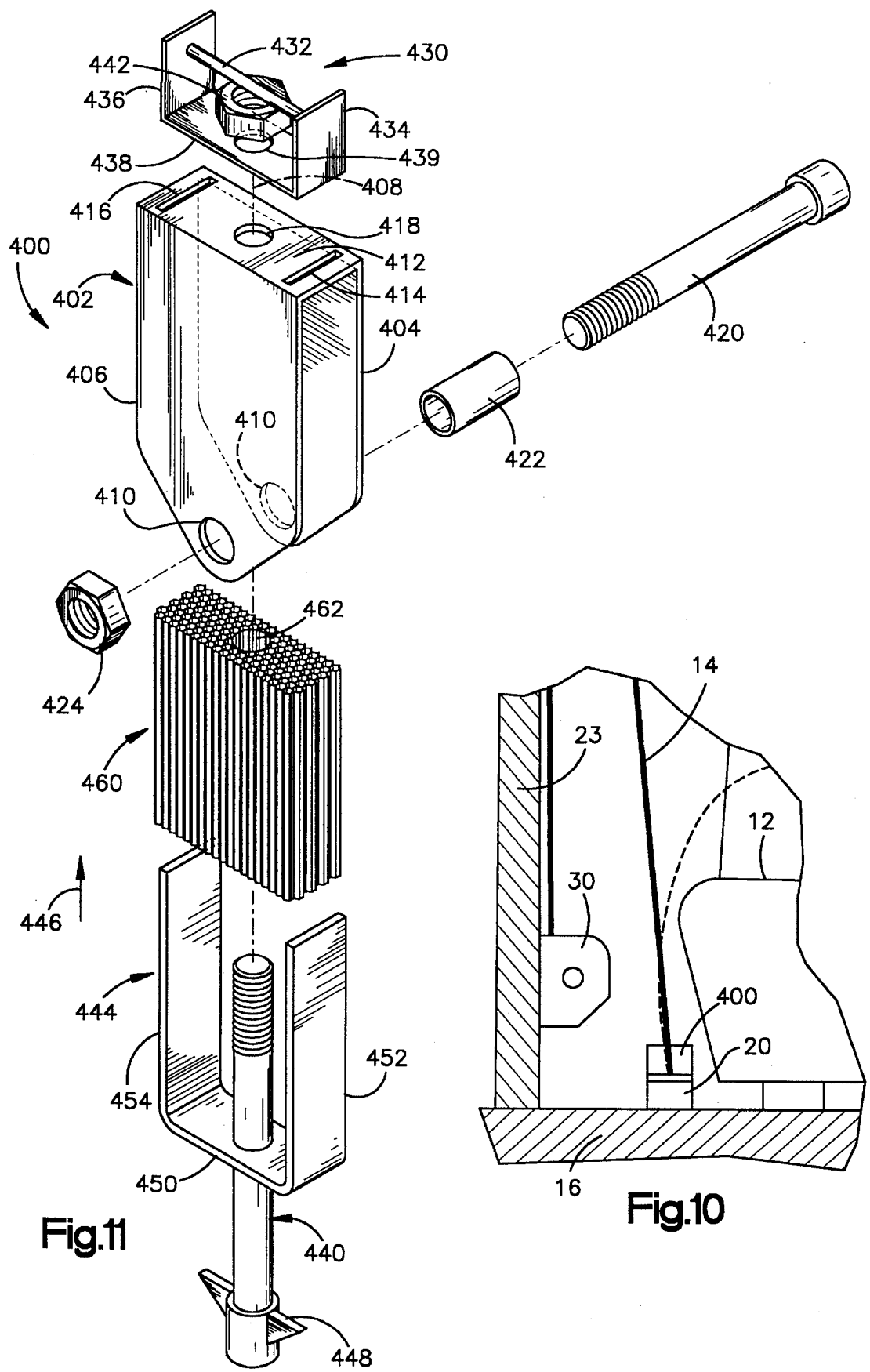

VEHICLE SEAT BELT SYSTEM

BACKGROUND OF THE INVENTION

1. Technical Field

The present invention relates to a vehicle occupant restraint system, and is particularly directed to a vehicle occupant restraint system including seat belt webbing for restraining a vehicle occupant.

2. Description of the Prior Art

Seat belt systems are commonly used to restrain vehicle occupants. A typical seat belt system for a vehicle occupant includes a length of belt webbing extensible about the vehicle occupant. The length of belt webbing extends across the occupant's torso to a webbing guide or D-ring located adjacent the occupant's shoulder. From the D-ring, the length of belt webbing extends downward to an anchor point located adjacent the vehicle floor. In the event of sudden vehicle deceleration such as occurs in a vehicle collision, the occupant initially continues to move forward relative to the vehicle, but thereafter is restrained by the belt webbing.

The vehicle occupant can experience a sudden load if the occupant's forward movement is restrained by an inextensible length of belt webbing. To alleviate this sudden load, it is known to include an energy management device in the seat belt system. When the occupant engages the belt webbing with sufficient force, the occupant's movement is restrained at a reduced rate over an increased period of time. This can reduce the abruptness of the load experienced by the vehicle occupant.

In some known seat belt systems, the D-ring is manually adjustable between different positions so that the D-ring and the portion of seat belt webbing extending across an occupant's torso may be located in positions selected by the vehicle occupant. Positions of the seat belt webbing other than the position selected by the vehicle occupant may, however, provide improved occupant restraint during a vehicle collision.

SUMMARY OF THE INVENTION

The present invention is a vehicle safety apparatus for use in a vehicle having a seat for an occupant of the vehicle. The vehicle safety apparatus includes a length of seat belt webbing for restraining the vehicle occupant in the event of sudden vehicle deceleration such as occurs in a vehicle collision. The vehicle safety apparatus also includes a webbing guide for guiding the seat belt webbing, support means for supporting the webbing guide for movement on the vehicle, and an actuatable device for, when actuated, moving the webbing guide on the vehicle. An end portion of the seat belt webbing is connected to the vehicle in a force-transmitting relationship. Energy absorber means is connected with the seat belt webbing for reducing shock load on the vehicle occupant in the event of sudden vehicle deceleration by enabling the occupant to move when the force applied by the occupant to the belt webbing exceeds a predetermined force. First sensing means senses a vehicle occupant characteristic. Control means is responsive to the sensed vehicle occupant characteristic for limiting movement of the webbing guide, upon actuation of the actuatable device, to a relocated position dependent upon the sensed vehicle occupant characteristic.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic view of a vehicle seat and a vehicle occupant restraint system which is constructed in accordance with the present invention and which includes a D-ring positioner assembly and an energy management device;

FIG. 2 is a view taken approximately along line 2—2 of FIG. 1 and showing an occupant in the vehicle seat;

FIG. 8 is a view similar to FIG. 2 showing a D-ring positioner assembly in accordance with a second embodiment of the present invention;

FIG. 9 is a view similar to FIG. 8 showing the D-ring positioner assembly of FIG. 8 in a second condition;

FIG. 10 is a schematic illustration of a portion of a vehicle seat belt system including a seat belt webbing energy management device in accordance with a third embodiment of the present invention; and FIG. 11 is an exploded perspective view of the energy management device of FIG. 10.

DESCRIPTION OF PREFERRED EMBODIMENTS OF THE INVENTION

Figure 3:
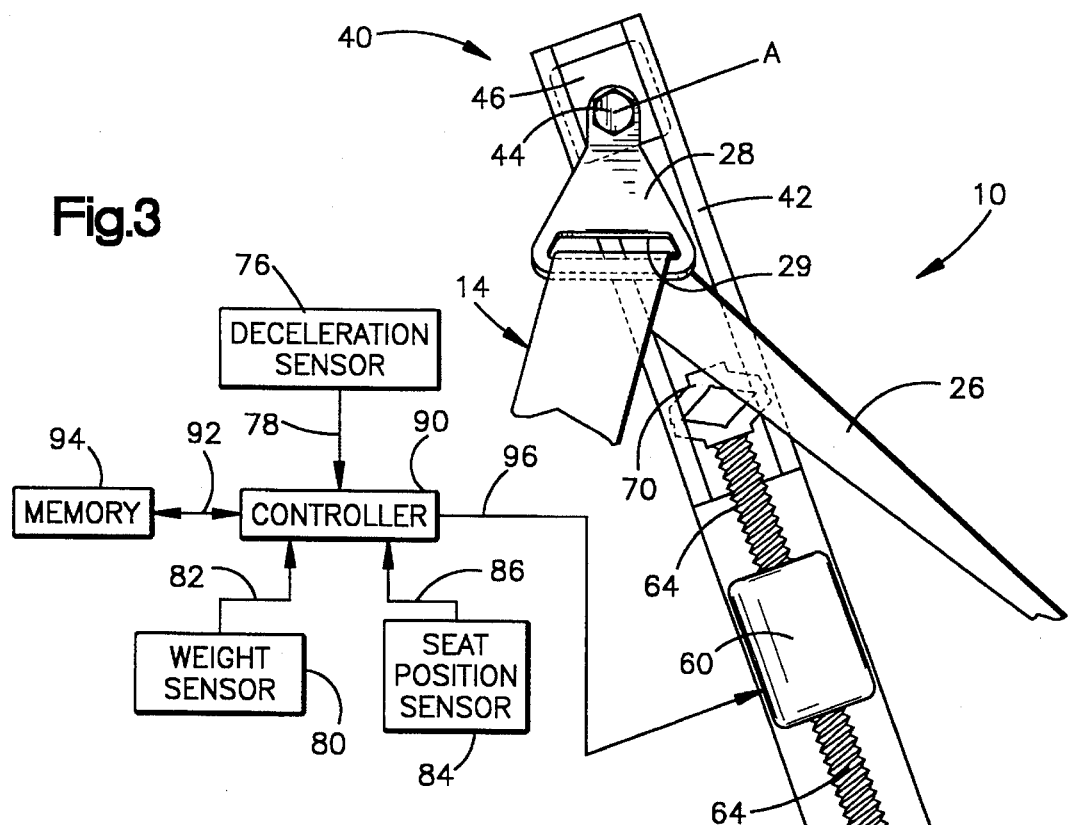
FIG. 3 is an enlarged view of the D-ring positioner assembly of FIG. 1 shown in a first condition.

The present invention relates to a vehicle occupant restraint system which uses seat belt webbing to restrain a vehicle occupant. The present invention is applicable to various vehicle occupant restraint system constructions. As representative of the present invention, FIGS. 1 and 2 illustrate a three-point continuous loop seat belt system 10 for restraining an occupant 11 of a vehicle. The vehicle occupant 11 is seated on a vehicle seat 12 which is illustrated as a driver's seat in the vehicle. The vehicle seat 12 has a seat back 13 and a seat cushion 15.

The seat belt system 10 includes a length of seat belt webbing 14 which is extensible about the vehicle occupant 11. One end of the length of seat belt webbing 14 is anchored to the vehicle body 16 at an anchor point 18. A lap belt section 20 of the seat belt webbing 14 extends across the seat cushion 15 of the vehicle seat 12 to a tongue assembly 22 received in a buckle 24 secured to the vehicle body 16. A shoulder belt section 26 of the seat belt webbing 14 extends from the tongue assembly 22 upwardly across the seat back 13 to a seat belt webbing guide in the form of a D-ring 28.

The seat belt webbing 14 passes through an opening 29 in the D-ring 28 and extends vertically downward to a seat belt retractor 30. Associated with the retractor 30 is a known seat belt pretensioner 32. The pretensioner 32 includes an actuatable pyrotechnic device for tensioning the seat belt webbing 14 upon actuation. The structure and operation of the seat belt pretensioner 32 are known and so will not be described herein.

The seat belt system 10 includes a D-ring positioner assembly 40 (FIG. 3) in accordance with the present invention. The D-ring positioner assembly 40 includes a track 42 (FIGS. 3 and 4) mounted on the B-pillar 23 of the vehicle. The track 42 may lie along a line parallel to the centerline of the B-pillar 23. The D-ring 28 is secured by a bolt 44 to a bracket 46. The bracket 46 is slidably mounted on the track 42 and supports the D-ring 28 for sliding movement along the track in a generally vertical direction.

The D-ring 28 is shown in FIG. 3 in a normal position "A" to which the D-ring is manually adjusted in a manner described below by the occupant 11 when the occupant is seated in the vehicle seat 12. The D-ring 28 is held in its normal position by a frictional latch which comprises frictional engagement between the bracket 46 and the track 42. Alternatively, a known mechanical latch could be used to hold the bracket 46 in position on the track 42.

An electric drive motor 60 (FIG. 3) is disposed at one end of the track 42. The motor 60 has a drive shaft which is drivingly engaged with a positioning screw 64. An end of the positioning screw 64 spaced from the motor 60 is attached to a D-ring stop 70, which is spaced apart from the bracket 46. As illustrated, the stop 70 is made of metal and has a shape such that the stop can be crushed as the result of sliding engagement by the bracket 46 to absorb some of the kinetic energy of the bracket. The stop 70, when crushed, expands laterally and locks frictionally to the track 42 so that the stop does not move relative to the track.

A deceleration sensor 76 shown schematically in FIG. 3 provides an output signal on line 78 in the event that the vehicle experiences deceleration of at least a predetermined magnitude which is indicative of a vehicle collision requiring actuation of the seat belt pretensioner 32. A weight sensor 80 provides an output signal on line 82 corresponding to the weight of the occupant 11 in the vehicle seat 12. The weight sensor 80 is located in the seat cushion 15 of the vehicle seat 12 and may be a piezoelectric sensor. Alternatively, the weight sensor 80 could be a weight scale mounted to seat attachment bolts, for example. Also, as schematically shown in FIG. 3, a seat position sensor 84 provides an output signal on line 86 corresponding to the position of the vehicle seat 12, and therefore the position of the occupant 11 in the vehicle, in the direction of travel of the vehicle. The position sensor 84 may be, for example, a potentiometer having its shaft operatively connected to the vehicle seat 12.

The output signals on lines 78, 82, 86 from the sensors 76, 80, 84 are electrically connected to a controller 90 which is preferably a microcomputer. The microcomputer 90 communicates via bus lines 92 with a memory 94 external to the microcomputer 90. The microcomputer 90 monitors the output signals on lines 78, 82, 86 from the sensors 76, 80, 84.

The microcomputer 90 generates a motor control signal on line 96 to control operation of the motor 60. The motor control signal on line 96 depends upon the output signals on lines 82, 86 from the weight sensor 80 and the seat position sensor 84. The motor control signal on line 96 is generated in a manner described below in accordance with a preprogrammed procedure stored in the external memory 94 and/or an internal memory of the microcomputer 90. Suitable microcomputers 90 are available in the commercial marketplace and, therefore, their structure and operation are not described herein.

To adjust or set the position of the D-ring 28, the vehicle occupant 11 manually applies force to the D-ring to release the latch and slide the bracket 46 along the track 42. The D-ring 28 can initially be located manually by the vehicle occupant 11 at any position, such as the position "A". In the position "A", the D-ring 28 is spaced apart along the track 42 from the stop 70. The position of the D-ring 28 as manually set by the vehicle occupant 11 is independent of the position of the stop 70.

After the vehicle occupant 11 is seated in the vehicle seat 12 and the vehicle ignition is turned on, the microcomputer 90 causes the motor 60 to move the stop 70 to a position dependent upon at least one characteristic of the occupant. The microcomputer 90 looks at a value stored in the memory 94 which is indicative of one or more characteristics of the occupant 11. The microcomputer 90 compares this stored value with the output signal on line 82 from the weight sensor 80 and/or with the output signal on line 86 from the seat position sensor 84. The microcomputer 90 generates the motor control signal on line 96 which is applied to the motor 60.

For example, if the sensed vehicle occupant characteristic is the weight of the vehicle occupant, then the memory 94 may include a look-up table for use in controlling the motor 60 in a manner dependent upon the weight of the vehicle occupant. The look-up table would have weight ranges and corresponding stored values for the desired position of the stop 70. Thus, if the sensed weight of the vehicle occupant is in a first low weight range, then the look-up table would indicate that the stop 70 should be set at a first position. If the sensed weight of the vehicle occupant is in a second, higher, weight range, then the look-up table would indicate that the stop 70 should be set at a second, higher, position.

The motor 60 is thereby controlled so that the stop 70 is moved to a position dependent upon the comparison of the stored value in the memory 94 and the output signal on line 82 and/or the output signal on line 86. The position of the stop 70 is preferably set at the time the vehicle ignition is turned on. The position to which the stop 70 is thus automatically set is independent of the manually adjusted position of the D-ring 28.

For example, the weight of the occupant 11 in the vehicle seat 12 may be relatively small and/or the position of the vehicle seat may be relatively rearward in the vehicle. In this case, the stop 70 is positioned relatively low on the track 42 so that the D-ring 28 can, in the event of a vehicle collision, be relocated relatively far downward to improve occupant restraint. On the other hand, the weight of the occupant 11 in the vehicle seat 12 may be relatively large and/or the position of the vehicle seat may be relatively forward in the vehicle. In that case, the stop 70 is positioned so that the D-ring 28 cannot, in the event of a vehicle collision, be relocated so far downward.

Figure 5:
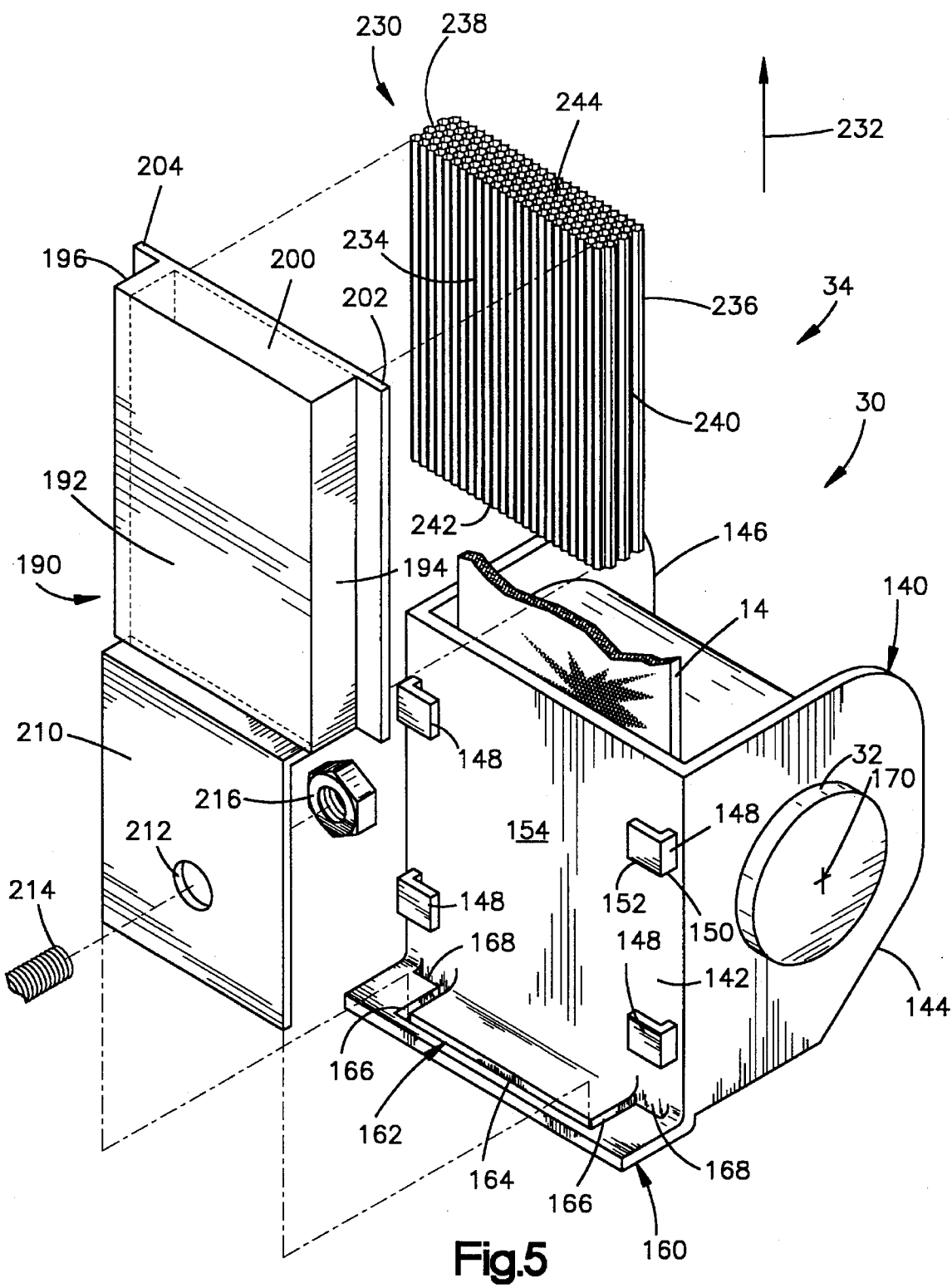
FIG. 5 is an exploded perspective view of the energy management device of FIG. 1.

The seat belt system 10 (FIGS. 1 and 2) also includes a seat belt webbing energy management device 34. The energy management device 34 includes the seat belt retractor 30. The retractor 30 includes a frame 140 (FIG. 5). The frame 140 is a single piece of sheet metal stamped and formed to a U-shaped configuration which includes a back wall 142 and spaced parallel side walls 144 and 146.

Two pairs of opposed guide tabs 148 are formed on the back wall 142 of the retractor frame 140. Each guide tab 148 has a first leg 150 extending perpendicular to the back wall 142 and a second leg 152 extending from the first leg 150 in a direction parallel to the back wall. Each one of the second legs 152 of the guide tabs 148 is spaced apart from the back wall 142 by the same predetermined distance. The guide tabs 148 define between them a channel 154 which extends parallel to and along the outer side surface of the back wall 142 of the retractor frame 140.

The retractor frame 140 includes a crush plate 160 which is formed in one piece with the frame 140 and which extends in a direction perpendicular to the back wall 142 from the lower end (as viewed in FIG. 5) of the back wall. A guide slot 162, which is preferably U-shaped, extends through the crush plate 160. The guide slot 162 could be of a different shape. The guide slot 162 includes a base portion 164 which extends parallel to the plane of the back wall 142. Parallel side portions 166 of the guide slot 162 extend from opposite ends of the base portion 164 in a direction perpendicular to the base portion and parallel to the side walls 144 and 146 of the retractor frame 140. Parallel flange portions 168 of the guide slot 162 extend from the ends of the side portions 166 along the back wall 142 of the frame 140.

Figure 6:
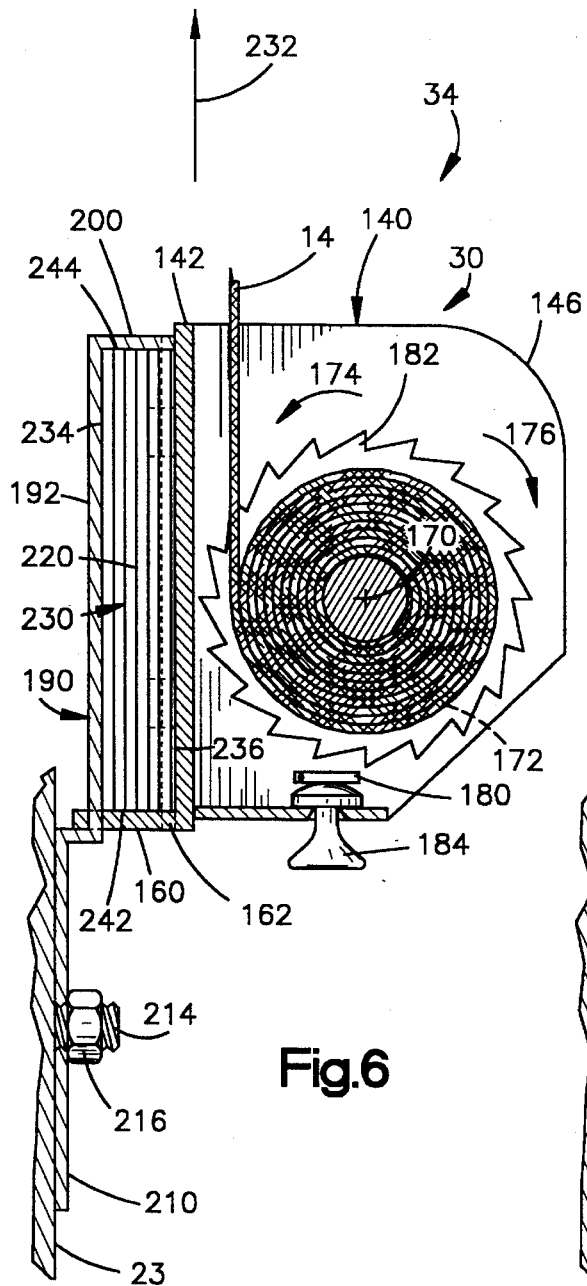
FIG. 6 is a side view partially in section showing the energy management device of FIG. 5 in an unactuated condition.
Figure 7:
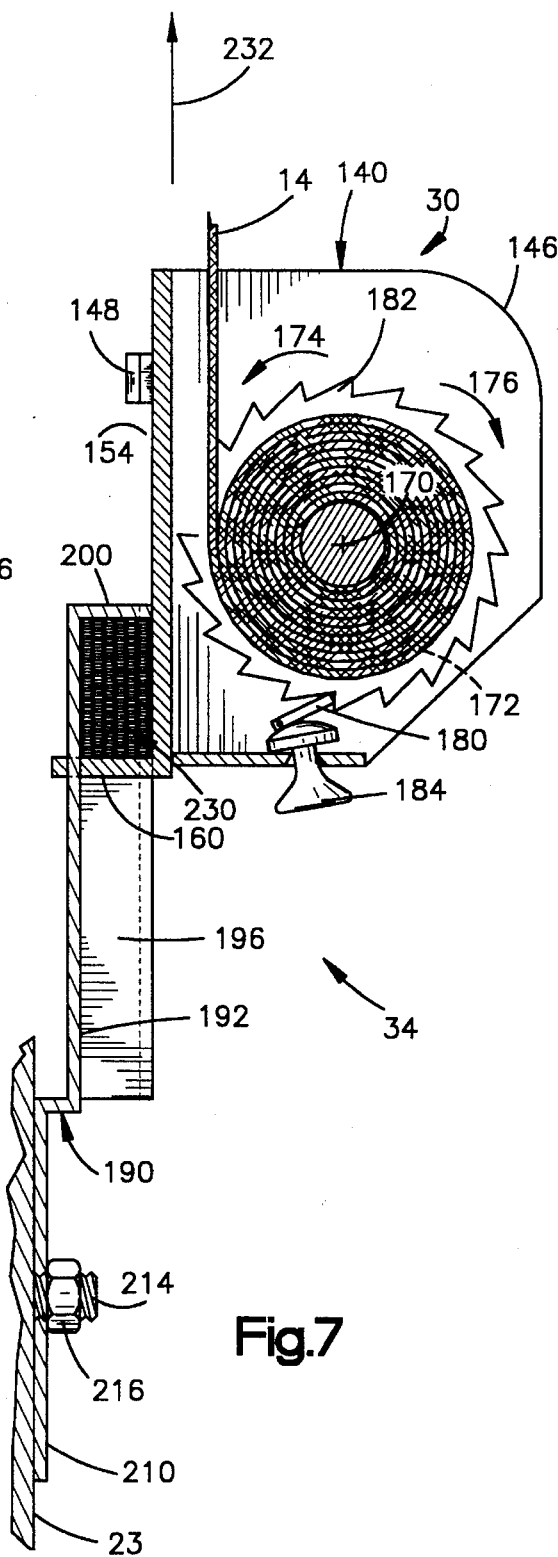
FIG. 7 is a view similar to FIG. 6 showing the energy management device of FIG. 5 in an actuated condition.

A spool axis 170 (FIGS. 5 and 6) of the retractor 30 extends between the frame side walls 144 and 146 in a direction parallel to the back wall 142. A spool 172 (FIG. 6) is supported on the frame 140 for rotation about the spool axis 170 relative to the frame in a belt winding direction 174 and in an opposite belt withdrawal direction 176. The seat belt webbing 14 is wound on the spool 170. The unwound portion of the seat belt webbing 14 extends upward from the retractor 30, as shown in FIGS. 5–7.

A rewind spring mechanism (not shown) on the frame 140 is connected with the spool 172 and biases the spool 172 for rotation in the belt winding direction 174. The retractor 30 includes a spool locking mechanism which includes a pawl 180, a ratchet 182, and a vehicle deceleration sensing mechanism 184. The spool locking mechanism 180–184 blocks rotation of the spool 172 in the belt withdrawal direction 176 in the event of vehicle deceleration above a predetermined level. The retractor 30 may also include web sensing means (not shown) for blocking rotation of the spool 172 in the belt withdrawal direction 176 in the event of belt withdrawal at a rate above a predetermined rate.

The energy management device 34 includes a mounting bracket 190 (FIG. 5) for supporting the retractor 30 on the vehicle B-pillar 23. The mounting bracket 190 (FIGS. 5–7) is made from sheet metal and includes a back wall 192 and spaced parallel side walls 194 and 196 which extend perpendicular to the back wall. The side walls 194 and 196 of the mounting bracket are spaced apart by a distance equal to the distance (as measured in a direction parallel to the spool axis 170) between the side portions 166 of the guide slot 162 of the crush plate 160.

The back wall 192 of the mounting bracket 190 is received in the base portion 164 of the guide slot 162 on the crush plate 160. The side walls 194 and 196 of the mounting bracket 190 are received in the side portions 166 of the guide slot 162. The mounting bracket 190 also includes a pair of guide flanges 202 and 204 which extend outwardly from the side walls 194 and 196, respectively. The guide flanges 202 and 204 are received in the flange portions 168 of the guide slot 162 of the crush plate 160 and extend between the second legs 152 of the guide tabs 148 and the back wall 142 of the retractor frame 140.

An end wall 200 of the mounting bracket 190 extends perpendicular to the back wall 192 and to the side walls 194 and 196. The end wall 200 connects the back wall 192 with the side walls 194 and 196 to close the upper end (as viewed in FIG. 5) of the mounting bracket 190.

An attachment portion 210 of the mounting bracket 190 extends from the lower end of the back wall 192 of the mounting bracket. The attachment portion 210 is generally L-shaped so that it extends first perpendicular to the back wall 192 and then parallel to, but spaced from, the plane of the back wall. A fastener opening 212 is formed in the attachment portion 210. A bolt 214 and a nut 216 fix the mounting bracket 190 in position on the vehicle B-pillar 23.

The retractor frame 140 and the mounting bracket 190 together define a chamber 220 (FIG. 6) which has a rectangular configuration. A crushable energy absorbing material 230, which is preferably a honeycomb, is disposed in the chamber 220. The honeycomb 230 is made of aluminum or stainless steel honeycomb material which may be purchased from Hexcel Corporation of Dublin, Calif. The honeycomb 230 could alternatively be made of plastic, which generally has a lower crush resistance than metal. The honeycomb 230 comprises a plurality of layers of material defining cells which extend parallel to the back wall 142 of the retractor frame 140 in a first direction 232 (upward as viewed in FIGS. 6 and 7). As explained in more detail below, the honeycomb 230 has a linear crush resistance.

The honeycomb 230 (FIG. 5) has a rectangular configuration. The honeycomb 230 has generally parallel major side surfaces 234 and 236 and generally parallel minor side surfaces 238 and 240, all of which extend parallel to the first direction 232. The honeycomb 230 also has parallel lower and upper end surfaces 242 and 244 which extend perpendicular to the side surfaces 234–240 and perpendicular to the first direction 232. The upper end portion of the honeycomb 230 including the upper end surface 244 is precrushed.

The parts of the energy management device 34 have an unactuated condition as shown in FIG. 6. The honeycomb 230 is disposed in the chamber 220 between the retractor 30 and the mounting bracket 190. The lower end surface 242 of the honeycomb 230 is in abutting engagement with the crush plate 160. The upper end surface 244 of the honeycomb 230 is in abutting engagement with the end wall 200 of the mounting bracket 190. One major side surface 236 of the honeycomb 230 is in abutting engagement with the back wall 142 of the retractor frame 140. The opposite major side surface 234 of the honeycomb 230 is in abutting engagement with the back wall 192 of the mounting bracket 190. The minor side surfaces 238 and 240 of the honeycomb 230 are in abutting engagement with the side walls 196 and 194 of the mounting bracket 190. The guide tabs 148 and the guide slot 162 on the retractor frame 140 cooperate with the mounting bracket 190 to support the retractor 30 for sliding movement in the direction 232 relative to the mounting bracket.

When the energy management device 34 is in the unactuated condition, the honeycomb 230 resists movement of the crush plate 160 in the direction 232 toward the end wall 200 of the mounting bracket 190. The crush resistance of the honeycomb 230 is selected so that the honeycomb blocks movement of the retractor 30, including the crush plate 160, in the direction 232 unless a tensile force greater than a predetermined force is applied to the belt webbing 14 when the spool locking mechanism 180–184 is actuated. The predetermined force is selected to be a force which is not normally experienced during use of the seat belt system 10 other than in a vehicle collision. Thus, the parts of the energy management device 34, including the retractor 30 and the mounting bracket 190, are normally in the position shown in FIG. 6, in which the honeycomb 230 is not crushed. The D-ring 28 (FIG. 3) is in a position, such as the position "A" as manually set by the vehicle occupant 11.

In the event of a vehicle collision, the seat belt pretensioner 32 (FIGS. 1–4) is actuated to take up slack in the seat belt webbing 14 and tension the seat belt webbing in a known manner. The tension force in the seat belt webbing 14 due to the pretensioner 32 is applied to the D-ring 28. The force on the D-ring 28 due to the pretensioner overcomes the latch holding the bracket 46 in position on the track 42. The D-ring 28 is pulled downward from position "A" shown in FIG. 3. The D-ring 28 continues moving downward on the vehicle due to the force of the pretensioner 32 until the bracket 46 engages and crushes the stop 70 as shown in FIG. 4.

As the stop 70 is being crushed, kinetic energy of the bracket 46 is absorbed. Also, as the stop 70 is being crushed, the material of the stop collapses and wedges against the walls of the track 42 to lock the stop in place relative to the track. The stop 70 blocks further downward movement of the bracket 46 and the D-ring 28 along the track 42. The D-ring 28 is then in a relocated position "B" such as shown in FIG. 4. The relocated position to which the D-ring 28 has moved depends upon the location of the stop 70 along the track 42. The location of the stop 70 is previously set by the motor 60 in the manner described above.

Figure 4:
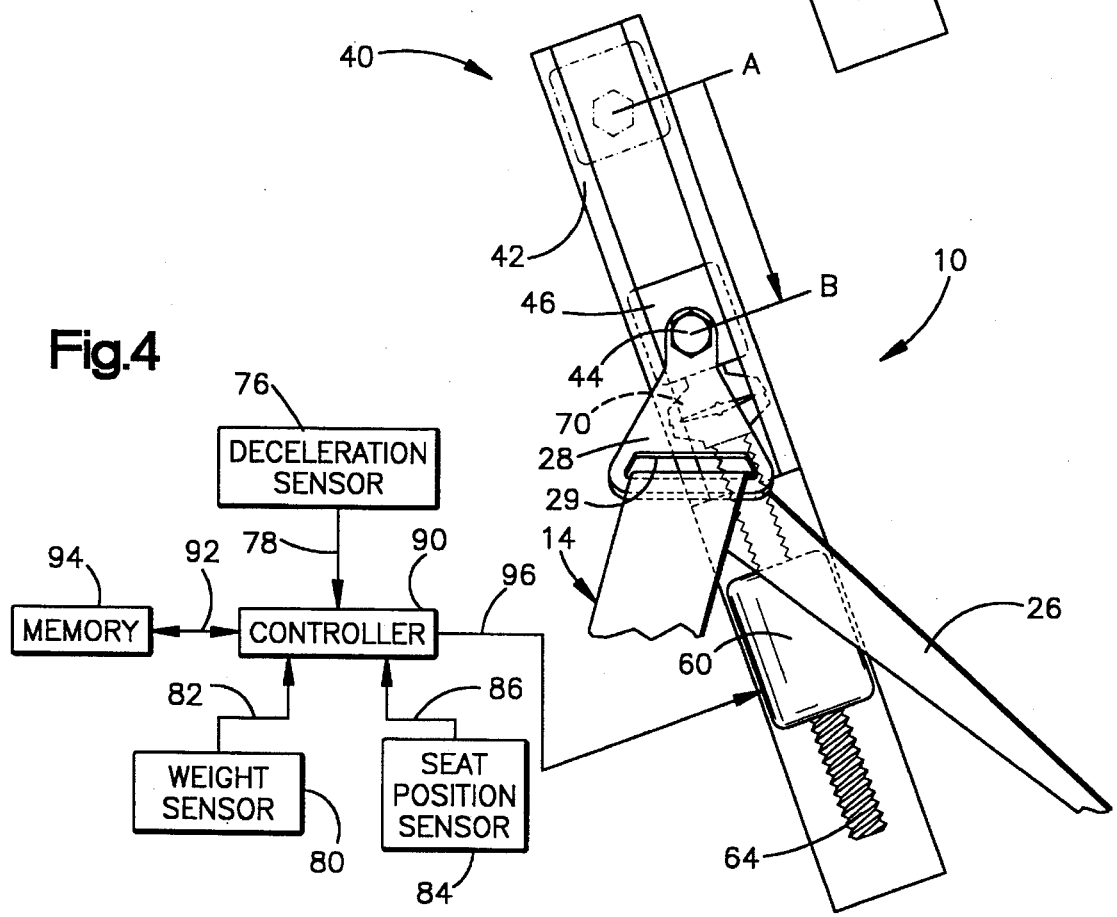
FIG. 4 is a view similar to FIG. 3 and showing the D-ring positioner assembly in a second condition.

When the D-ring 28 is in the relocated position "B" such as shown in FIG. 4, the seat belt webbing 14 is also in a relocated position such as shown in FIG. 4. Specifically, the shoulder belt portion 26 of the seat belt webbing 28 is repositioned lower on the vehicle occupant's torso. The section 280 (FIG. 1) of the belt webbing 14 which extends between the D-ring 28 and the torso of the vehicle occupant is more horizontally oriented.

The energy management device 34 also helps to reduce the load on the vehicle occupant in the event of a vehicle collision. As the vehicle experiences the sudden deceleration which occurs in a vehicle collision, the vehicle deceleration sensing mechanism 184 (FIGS. 6 and 7) causes the pawl 180 to move into engagement with the ratchet 182 to block rotation of the spool 172 in the belt withdrawal direction 176. Once the spool 172 is thus locked, the kinetic energy of the forward moving vehicle occupant is transmitted through the belt webbing 14 and the spool 172 into the retractor frame 140.

The honeycomb 230 blocks sliding movement of the retractor frame 140 in the direction 232 until a tensile force greater than the predetermined force is applied to the belt webbing 14. When a force greater than the predetermined force is applied to the belt webbing 14, the honeycomb 230 begins to crush and the retractor 30 moves in the direction 232, over a period of time, from the position shown in FIG. 6 to the position shown in FIG. 7.

As the retractor moves in the direction 232, the crush plate 160 slides along the walls 192, 194 and 196 and moves in the direction 232 through the chamber 220. The honeycomb 230 crushes and slows movement of the crush plate 160 as long as sufficient force is applied to the honeycomb 230. The end wall 200 of the mounting bracket 190 acts as a stop member against which the force of the crush plate 160, as transmitted through the honeycomb 230, is exerted. The force exerted by the moving crush plate 160 on the honeycomb 230 causes the honeycomb to be crushed between the moving crush plate and the end wall 200 of the mounting bracket 190. A property of the material of the honeycomb 230 causes the honeycomb to crush from its precrushed upper end portion, including the surface 244, to its lower end surface 242. The layers of material defining the cells in the honeycomb 230 crush (i.e., experience local buckling) simultaneously without column buckling as the crush plate 160 moves toward the end wall 200. Eventually, the honeycomb 230 is crushed into a relatively short, almost solid mass of material as seen in FIG. 7, and the crush plate 160 is blocked from further movement. The retractor 30, which is fixed for movement with the crush plate 160, ceases moving in the direction 232. The tensile force on the belt webbing 14 is thereafter transmitted substantially undiminished between the retractor frame 140 and the vehicle B-pillar 23.

The crushing of the honeycomb 230 is not instantaneous but instead occurs over a period of time. During this time period, the seat belt system 10 does not fully block forward movement of the vehicle occupant 11. The occupant's forward movement does not cease until the force applied to the belt webbing 14 by the occupant is not sufficient to crush the honeycomb 230. At this time, the retractor 30 stops moving in the direction 232 relative to the B-pillar 23.

In an event such as a vehicle collision, occupant deceleration resulting from engagement with the seat belt system 10 occurs over a longer period of time than it would occur if the belt webbing 14 in the system were connected to an immovable retractor, rather than to the energy management device 34. In addition, the crushing of the honeycomb 230 reduces the shoulder seat belt restraining force, $F_{shb}$, acting on the occupant's upper torso. Thus, as described more fully below, more crash energy is dissipated by the seat belt system 10, and the amount of energy transferred through the seat belt webbing 14 to the vehicle occupant 11 is reduced. Together with the repositioning of the D-ring 28 as described above, this reduces the abruptness of the load on the vehicle occupant 11 during a vehicle collision.

The principle of conservation of energy states that the total occupant crash energy must be conserved. The total occupant crash energy is $\frac{1}{2}$ m $(v_i^2-v_f^2)$, where m is the occupant's mass, $v_i$ is the velocity of the occupant at the beginning of the crash, and $v_f$ is the velocity of the occupant at the end of the crash. The total occupant crash energy is dissipated by performing work on the occupant. Work, which is a force applied over a distance, must be performed on the occupant to stop the occupant's motion. In a crash, work is performed on a vehicle occupant in a variety of means, including physical absorption by the occupant (through a force applied to and deflecting the occupant's chest), interaction between the occupant and the vehicle seat, and interaction between the occupant and the seat belt system. The purpose of the energy management device 34 is to reapportion the work among the various means so that more work is performed by interaction between the occupant and the seat belt system and less is physically absorbed by the occupant. The occupant's interaction with the seat belt system causes energy to be dissipated through two basic mechanisms—deformation of the components of the system and crushing of the honeycomb material.

The energy dissipated through the webbing into the occupant is represented by the integral of the shoulder belt restraining force, $F_{shb}$, with respect to crash ridedown distance, x (i.e., the distance through which the occupant moves with respect to a fixed point on the ground during a crash) or $\int F_{shb} dx$. The energy dissipated through crushing of the honeycomb material is represented by the integral of the shoulder belt restraining force, $F_{shb}$, with respect to the occupant restraint crush distance, x' (i.e., the distance through which the occupant moves with respect to the vehicle as the honeycomb is being crushed during a crash) or $\int F_{shb} dx'$.

Because the honeycomb material crushes, the distance, x', through which the occupant moves with respect to the vehicle as the honeycomb is being crushed during a crash, has a value greater than zero. For a given shoulder belt restraining force, $F_{shb}$, the greater the distance, x', the larger the value of the integral, $\int F_{shb} dx'$ and the more energy that is dissipated through crushing of the honeycomb material. Because the honeycomb has little resilience, i.e., large hysteresis, there is little energy stored in the honeycomb which can be transferred back into the seat belt system 10 at a later point in the crash. The dissipation of energy through crushing of the honeycomb material also reduces the energy transferred through the seat belt webbing into the occupant. Specifically, since the total occupant crash energy must be conserved, any dissipation of energy through crushing of the honeycomb material reduces the amount of energy transferred through the seat belt webbing into the occupant. The energy management device 34 thus helps to manage and control the kinetic energy of the moving vehicle occupant resulting from sudden vehicle deceleration.

The speed of movement of the crush plate 160 is controlled by the honeycomb 230. The material of the honeycomb 230 has a nearly linear crush resistance. Therefore, as the crush plate 160 moves toward the end wall 200, the honeycomb 230 provides a constant and unvarying resistance to the movement of the crush plate. The structure and material of the honeycomb 230 can be varied to control the crush resistance of the honeycomb and thus the rate of movement of the crush plate 160 in the chamber 220. Accordingly, selection of an appropriate material for the honeycomb 230 can control the characteristics of the energy management device 34 including the rate of movement of the retractor 30. Crushable honeycomb materials and their characteristics are well known.

FIGS. 8 and 9 illustrate a D-ring positioner assembly 40a which is constructed in accordance with a second embodiment of the present invention. Since the embodiment of the invention illustrated in FIGS. 8 and 9 is generally similar to the embodiment of the invention illustrated in FIGS. 1–4, similar numerals with the suffix letter "a" added are used to designate similar components.

The D-ring positioner assembly 40a (FIG. 8) includes a cam plate 300 with which the D-ring 28a is connected for movement. The cam plate 300 is mounted on the vehicle B-pillar in a manner not shown for pivotal movement about a pivot point designated "P" in FIG. 8. One end of a cable 302 is connected to an actuatable pyrotechnic driver 304. The opposite end of the cable 302 is connected to the cam plate 300. The cam plate 300 is pivotable about point P when tension is applied to the cable 302 in response to actuation of the pyrotechnic driver 304.

The D-ring 28a is shown in FIG. 8 in a normal or unactuated position. In the event of a vehicle collision, the pyrotechnic driver 304 is actuated by the controller 90 (FIG. 4) to pivot the cam plate 300 about point P from its normal position "A" shown in FIG. 8. The cam plate 300 continues pivoting about point P until the cam plate engages the stop 70a as shown in FIG. 9. The stop 70a shown in FIGS. 8 and 9 is constructed and operates in the same manner as the stop 70 described above with regard to the embodiment of the invention shown in FIGS. 1–4. When the cam plate 300 engages the stop 70a, the D-ring 28a is in a relocated position "B", such as shown in FIG. 9.

When the cam plate 300 is in the relocated position shown in FIG. 9, the seat belt webbing 14a is also in a relocated position, as shown in FIG. 9. The relocated position to which the seat belt webbing 14a moves depends upon the location of the stop 70a. Since the D-ring 28a is relocated using the pyrotechnic driver 304, the D-ring is relocated quickly during a vehicle collision (typically within the first 10 to 25 ms during the initial phase of the vehicle collision). Immediately after actuation of the pyrotechnic driver 304, the seat belt pretensioner 32a is actuated to take up slack in the seat belt webbing 14a and tension the seat belt webbing, in a known manner.

FIGS. 10 and 11 illustrate a seat belt webbing energy management device 400 which is constructed in accordance with a third embodiment of the present invention. As shown schematically in FIG. 10, the energy management device 400 is connected between the belt webbing 14 and the anchor point 18 at the outboard side of the vehicle seat 12. The energy management device 400 is included in the seat belt system 10 (FIG. 1) in place of the energy management device 34. Other portions of the vehicle seat belt system 10 in which the energy management device 400 is incorporated are the same.

The energy management device 400 (FIG. 11) includes a reaction member 402. The reaction member 402 has an inverted U-shaped configuration with spaced side walls 404 and 406 extending parallel to an axis 408. A circular opening 410 is formed in the lower end portion of each respective side wall 404, 406. An end wall 412 of the reaction member 402 is formed as one piece with the side walls 404 and 406 and interconnects the side walls. A pair of guide slots 414 and 416 extend through the end wall 412. A circular opening 418 is formed in the end wall 412 at a location centered on the axis 408.

The reaction member 402 is secured to the vehicle body 16 (not shown in FIG. 11) with an assembly of a bolt 420, a sleeve 422 and a nut 424. The bolt 420 extends through the sleeve 422 which is located in the openings 410 in the side walls 404 and 406 of the reaction member 402. The nut 424 is screwed on the bolt 420.

The energy management device 400 also includes a U-shaped end fitting 430. The end fitting 430 includes a pin 432 to which an end portion of the belt webbing 14 (not shown in FIG. 11) is secured. Opposite ends of the pin 432 are secured in axially extending side walls 434, 436 of the end fitting 430. An end wall 438 of the end fitting 430 is formed as one piece with the side walls 434, 436 and extends parallel to the end wall 412 of the reaction member 402. A circular opening 439 in the end wall 438 is centered on the axis 408.

A bolt 440 extends through the opening 439 in the end wall 438 of the end fitting 430. A nut 442 is screwed on the bolt 440 and is disposed on the upper side surface of the end wall 438. A head portion 448 of the bolt 440 is disposed under an end wall 450 of a crush plate 444. The crush plate 444 has a U-shaped configuration and includes parallel axially extending side walls 452, 454 which are formed as one piece with the end wall 450. The end wall 450 extends parallel to the end wall 412 of the reaction member 402, when the energy management device 400 is in an assembled condition (not shown), at a location above (as viewed in FIG. 11) the bolt 420. Upper end portions of the side walls 452, 454 of the crush plate 444 extend through the guide slots 414, 416 in the end wall 412 of the reaction member 402.

A crushable energy absorbing honeycomb 460 is disposed in a forced transmitting relationship between the end wall 450 of the crush plate 444 and the end wall 412 of the reaction member 402. The honeycomb 460 may be made of the same material as the honeycomb 230 described with reference to the first embodiment of the invention. The bolt 440 extends through an axially extending central passage 462 in the honeycomb 460.

The assembled energy management device 400 is installed at the location shown in FIG. 10. In the event of sudden deceleration such as occurs in a vehicle collision, the vehicle occupant initially continues moving forward in the vehicle relative to the vehicle seat 12 and engages the belt webbing 14. The kinetic energy of the forward moving vehicle occupant is transmitted through the belt webbing 14, the end fitting 430 and the bolt 440 into the crush plate 444.

The honeycomb 460 blocks movement of the crush plate 444 in a direction toward the end wall 412 of the reaction member 402 until a tensile force greater than a predetermined force is applied to the belt webbing 14. When a force greater than the predetermined force is applied to the belt webbing 14, the honeycomb 460 begins to crush and the crush plate 444 moves upward in the direction 446, over a period of time. The force exerted by the moving crush plate 444 on the honeycomb 460 causes the honeycomb to be crushed between the moving crush plate and the end wall 412 of the reaction member 402. The honeycomb 460 crushes and slows movement of the crush plate 444 as long as sufficient force is applied to the honeycomb. The end wall 412 of the reaction member 402 acts as a stop member against which the force of the crush plate 444, as transmitted through the honeycomb 460, is exerted.

Eventually, the honeycomb 460 is crushed into a relatively short, almost solid mass of material, and the crush plate 444 is blocked from further movement. Further movement of the end fitting 430 in the upward direction 446 is thus blocked. The tensile force on the belt webbing 14 is thereafter transmitted substantially undiminished between the end fitting 430 and the vehicle body 16.

From the above description of the invention, those skilled in the art will perceive improvements, changes and modifications in the invention. For example, the stop 70 may be made of an energy absorbing elastomeric material, and means other than the crushing of the stop may be provided for locking the stop to the track 42 when engaged by the bracket 46. Also, either embodiment 34 or 400 of the energy management device may be used in conjunction with either embodiment 40 or 40a of the D-ring positioner assembly. Such improvements, changes and modifications within the skill of the art are intended to be covered by the appended claims.

Having described the invention, we claim:

1. An apparatus for use in a vehicle having a vehicle seat and seat belt webbing extensible around an occupant of the vehicle seat, said apparatus comprising:

a webbing guide for guiding the seat belt webbing;

supporting means for supporting said webbing guide for movement;

a webbing guide stop movable between a plurality of different stop positions for stopping movement of said webbing guide;

first actuatable means for, when actuated, moving said webbing guide stop between the plurality of different stop positions;

second actuatable means for, when actuated, moving said webbing guide to a relocated position dependent upon a stop position of said webbing guide stop; and means for connecting an end portion of said seat belt webbing to the vehicle in a force-transmitting relationship, said means for connecting including energy absorber means for reducing shock load on the vehicle occupant in the event of sudden vehicle deceleration by enabling the occupant to move when the force applied by the occupant to said belt webbing exceeds a predetermined force.

2. An apparatus according to claim 1 wherein said second actuatable means includes a first pyrotechnic device for, when actuated, causing said webbing guide to move to said relocated position dependent upon the stop position of said webbing guide stop.

3. An apparatus according to claim 2 further comprising a second pyrotechnic device for, when actuated, pretensioning said seat belt webbing.

4. An apparatus as set forth in claim 1 wherein said energy absorber means comprises:

a seat belt webbing retractor having a spool on which said seat belt webbing is wound;

a crush plate secured to said retractor;

means for mounting said retractor on the vehicle for movement of said retractor and said crush plate in a first direction; and a crushable energy absorbing material disposed in the path of movement of said crush plate for controlling movement of said retractor in the first direction.

5. An apparatus as set forth in claim 4 wherein said crushable energy absorbing material comprises a honeycomb.

6. An apparatus according to claim 1 wherein said first actuatable means is responsive to a sensed vehicle occupant characteristic to move said webbing guide stop to a selected one of the plurality of different stop positions.

7. A vehicle safety apparatus for use in a vehicle having a seat for an occupant of the vehicle, comprising:

a length of seat belt webbing for restraining the vehicle occupant in the event of sudden vehicle deceleration such as occurs in a vehicle collision;

a webbing guide for guiding said seat belt webbing;

support means for supporting said webbing guide for movement on the vehicle;

an actuatable device for, when actuated, moving said webbing guide on the vehicle;

means for connecting an end portion of said seat belt webbing to the vehicle in a force-transmitting relationship, said means for connecting including energy absorber means for reducing shock load on the vehicle occupant in the event of sudden vehicle deceleration by enabling the occupant to move when the force applied by the occupant to said belt webbing exceeds a predetermined force;

first sensing means for sensing a vehicle occupant characteristic; and control means responsive to said sensed vehicle occupant characteristic for limiting movement of said webbing guide, by said actuatable device, to a relocated position that is selected based upon said sensed vehicle occupant characteristic;

said vehicle occupant characteristic being the weight of the occupant in the vehicle seat, said first sensing means including weight sensing means for sensing the weight of the occupant and for providing a signal indicative of said vehicle occupant characteristic.

8. A vehicle safety apparatus for use in a vehicle having a seat for an occupant of the vehicle, comprising:

a length of seat belt webbing for restraining the vehicle occupant in the event of sudden vehicle deceleration such as occurs in a vehicle collision;

a webbing guide for guiding said seat belt webbing;

support means for supporting said webbing guide for movement on the vehicle;

an actuatable device for, when actuated, moving said webbing guide on the vehicle;

means for connecting an end portion of said seat belt webbing to the vehicle in a force-transmitting relationship, said means for connecting including energy absorber means for reducing shock load on the vehicle occupant in the event of sudden vehicle deceleration by enabling the occupant to move when the force applied by the occupant to said belt webbing exceeds a predetermined force;

first sensing means for sensing a vehicle occupant characteristic; and control means responsive to said sensed vehicle occupant characteristic for limiting movement of said webbing guide, by said actuatable device, to a relocated position that is selected based upon said sensed vehicle occupant characteristic, said control means comprising a webbing guide stop movable between a plurality of different stop positions for stopping movement of said webbing guide.

9. A vehicle safety apparatus for use in a vehicle having a seat for an occupant of the vehicle, comprising:

a length of seat belt webbing for restraining the vehicle occupant in the event of sudden vehicle deceleration such as occurs in a vehicle collision;

a webbing guide for guiding said seat belt webbing;

support means for supporting said webbing guide for movement on the vehicle;

an actuatable device for, when actuated, moving said webbing guide on the vehicle in response to a condition indicative of the sudden vehicle deceleration;

means for connecting an end portion of said seat belt webbing to the vehicle in a force-transmitting relationship, said means for connecting including energy absorber means for reducing shock load on the vehicle occupant in the event of sudden vehicle deceleration by enabling the occupant to move when the force applied by the occupant to said belt webbing exceeds a predetermined force;

first sensing means for sensing a vehicle occupant characteristic; and control means responsive to said sensed vehicle occupant characteristic for limiting movement of said webbing guide upon the occurrence of the sudden vehicle deceleration, by said actuatable device, to a relocated position that is selected based upon said sensed vehicle occupant characteristic.

10. An apparatus according to claim 9 wherein said vehicle occupant characteristic is the position of the occupant in the vehicle seat relative to the forward and rearward directions of travel of the vehicle, said first sensing means including position sensing means for sensing the position of the occupant in the vehicle seat and for providing a signal indicative of said vehicle occupant characteristic.

11. An apparatus according to claim 9 further comprising second sensing means for sensing a vehicle collision characteristic, said vehicle collision characteristic being vehicle deceleration of at least a predetermined magnitude which is indicative of a vehicle collision, said actuatable device being actuatable in response to said second sensing means to cause said webbing guide to move to said relocated position dependent upon said signal indicative of said vehicle occupant characteristic.

12. An apparatus as set forth in claim 9 wherein said energy absorber means comprises:

a seat belt webbing retractor having a spool on which said seat belt webbing is wound;

a crush plate secured to said retractor;

means for mounting said retractor on the vehicle for movement of said retractor and said crush plate in a first direction; and a crushable energy absorbing material disposed in the path of movement of said crush plate for controlling movement of said retractor in the first direction.

13. An apparatus as set forth in claim 12 wherein said crushable energy absorbing material comprises a honeycomb.

14. An apparatus as set forth in claim 13 wherein said honeycomb is made of metal.

15. An apparatus as set forth in claim 13 wherein said honeycomb is made of plastic.

16. An apparatus according to claim 12 wherein said vehicle occupant characteristic is the weight of the occupant in the vehicle seat, said first sensing means including weight sensing means for sensing the weight of the occupant in the vehicle seat and for providing a signal indicative of said vehicle occupant characteristic.

17. An apparatus according to claim 12 wherein said first sensing means provides a signal, said apparatus further comprising memory means for storing a value indicative of said vehicle occupant characteristic and comparison means for comparing said signal from said first sensing means and said stored value in said memory means, said control means comprising a webbing guide stop and means for moving said webbing guide stop to a position dependent upon said comparison of said signal from said first sensing means and said stored value in said memory means, said means for moving said webbing guide stop including a positioning screw and an electric motor for driving said positioning screw.

18. An apparatus according to claim 9 wherein said first sensing means provides a signal, said apparatus further comprising memory means for storing a value indicative of said vehicle occupant characteristic and comparison means for comparing said signal from said first sensing means and said stored value in said memory means, said control means comprising a webbing guide stop and means for moving said webbing guide stop to a position dependent upon said comparison of said signal from said first sensing means and said stored value in said memory means.

19. An apparatus according to claim 18 wherein said means for moving said webbing guide stop includes a positioning screw and an electric motor for driving said positioning screw.

20. An apparatus according to claim 19 wherein said webbing guide stop includes means for absorbing kinetic energy of said webbing guide upon movement of said webbing guide to said relocated position dependent upon said vehicle occupant characteristic.

* * * * *